United States Patent [19]

Tulpule et al.

[11] Patent Number: 5,093,910
[45] Date of Patent: Mar. 3, 1992

[54] SERIAL DATA TRANSMISSION BETWEEN REDUNDANT CHANNELS

[75] Inventors: Bhalchandra R. Tulpule, Vernon; Daniel G. Binnall, Simsbury, both of Conn.

[73] Assignee: United Technologies Corporation, Hartford, Conn.

[21] Appl. No.: 708,802

[22] Filed: May 31, 1991

Related U.S. Application Data

[63] Continuation of Ser. No. 574,575, Aug. 28, 1990, abandoned, which is a continuation of Ser. No. 924,642, Oct. 29, 1986, Pat. No. 4,959,782.

[51] Int. Cl.⁵ .................... G06F 12/00; G06F 11/08; G06F 11/16
[52] U.S. Cl. ............................ 395/575; 364/DIG. 2; 364/966.5; 364/967.1; 364/944.2; 364/927.94; 364/926.93; 371/68.1
[58] Field of Search ... 364/200 MS File, 900 MS File, 364/200, 900; 371/68.1

[56] References Cited

U.S. PATENT DOCUMENTS

| | | | |
|---|---|---|---|
| 3,587,044 | 6/1971 | Jenkins | 364/200 |
| 4,101,958 | 7/1978 | Patterson et al. | 364/200 |
| 4,225,919 | 9/1980 | Kru et al. | 364/200 |
| 4,270,168 | 5/1981 | Murphy et al. | 371/68 |
| 4,371,932 | 2/1983 | Dinwiddie, Jr. et al. | 364/200 |
| 4,403,282 | 9/1983 | Holberger et al. | 364/200 |
| 4,413,319 | 11/1983 | Schultz et al. | 364/200 |
| 4,441,162 | 4/1984 | Lillie | 364/900 |
| 4,443,850 | 4/1984 | Harris | 364/200 |
| 4,453,211 | 6/1984 | Askinazi et al. | 364/200 |
| 4,471,427 | 9/1984 | Harris | 364/200 |
| 4,577,272 | 3/1986 | Ballew et al. | 364/200 |
| 4,593,396 | 6/1986 | Anderson, Jr. | 364/200 |
| 4,625,307 | 11/1986 | Tulpule et al. | 370/85 |
| 4,774,709 | 9/1988 | Tulpule et al. | 371/68 X |

Primary Examiner—Gareth D. Shaw
Assistant Examiner—P. V. Kulik
Attorney, Agent, or Firm—Francis J. Maguire, Jr.

[57] ABSTRACT

Data is communicated between redundant channels formatted in blocks having an initial command word followed by a destination code, starting address and a variable number of data words including a word count. The blocks are transmitted between each channel and all of the channels over cross-channel data links, each channel receiving the data blocks and determining the validity thereof by counting the number of data words received and comparing that number to the word count transmitted for that block. An interrupt signal indicative of invalidity of a block is provided in the event of a miscompare. A stop address is generated for each block received for storage at the start address. A memory address is generated for each valid word received for storage in sequence starting immediately after the start address. The next block received has its start address placed immediately at the end of the previously received block.

7 Claims, 7 Drawing Sheets

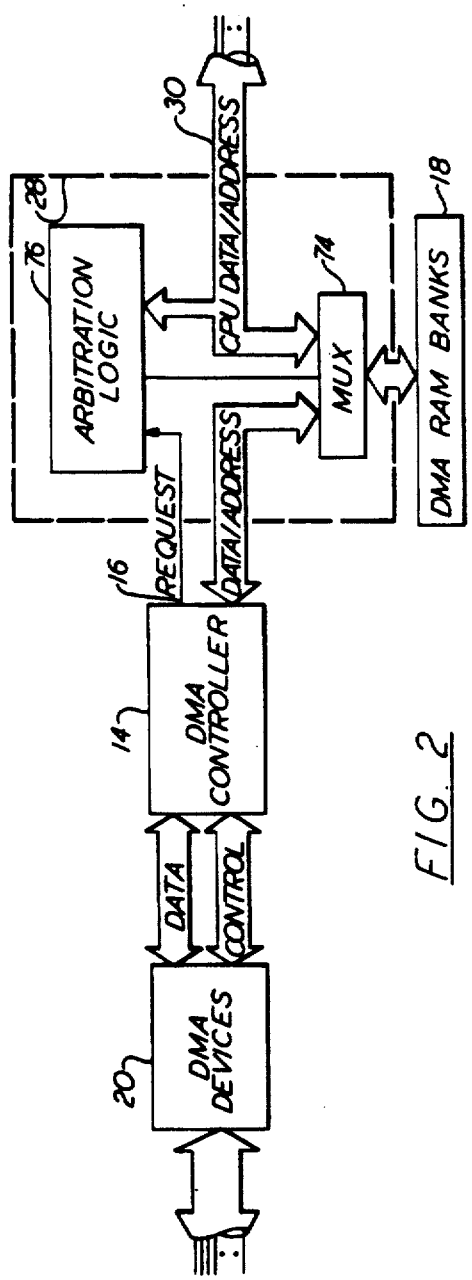
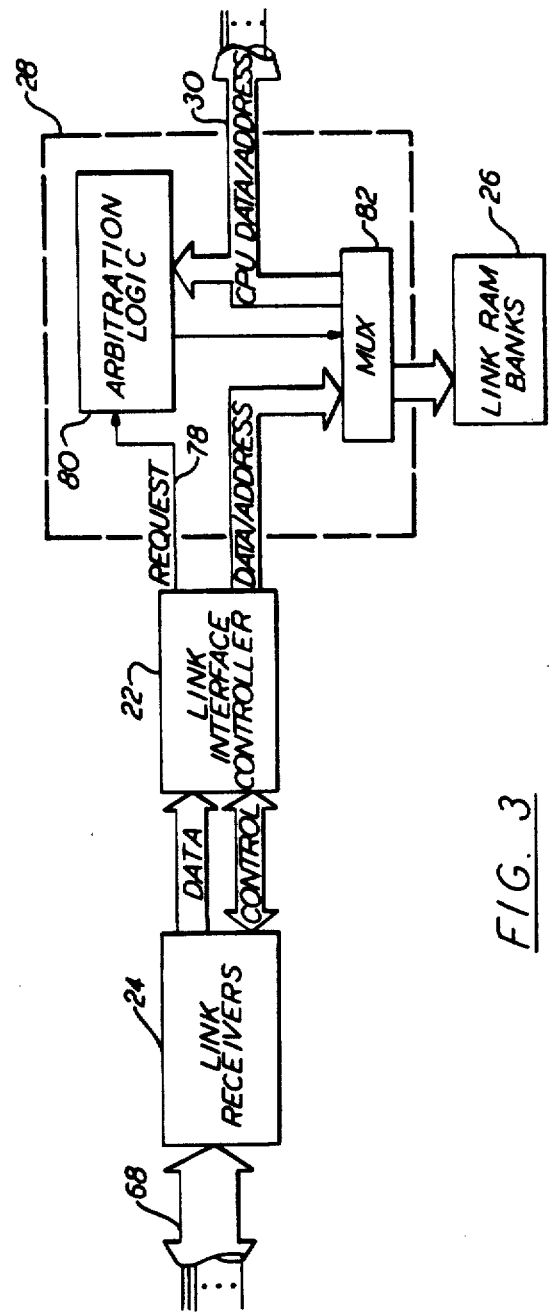
FIG. 2
FIG. 3

| BIT | RAM READ | RAM WRITE | MUX | CONTROL |
|---|---|---|---|---|
| 0 | 0 | 0 | 1 | 1 |
| 1 | 0 | 1 | 0 | 1 |
| 2 | CMND SYNC | CMND SYNC | — | — |
| 3 | LINK XMIT | LINK XMIT | — | EOF |
| 4 | A1 | A1 | | |
| 5 | A2 | A2 | | |
| 6 | A3 | A3 | | |
| 7 | A4 | A4 | | |
| 8 | A5 | A5 | A/D MUX 0 | |
| 9 | A6 | A6 | A/D MUX 1 | |
| 10 | A7 | A7 | A/D MUX 2 | |
| 11 | A8 | A8 | A/D MUX 3 | |
| 12 | A9 | A9 | A/D MUX 4 | |
| 13 | A10 | A10 | A/D MUX 5 | |
| 14 | A11 | A11 | A/D MUX 6 | |
| 15 | A12 | A12 | A/D MUX 7 | |
| 16 | EOB | EOB | EOB | EOB |
| 17 | RTI | RTI | RTI | RTI |
| 18 | D0 | S0 | MUX SEL 0 | CONV 0 |
| 19 | D1 | S1 | MUX SEL 1 | CONV 1 |
| 20 | D2 | S2 | MUX SEL 2 | CONV 2 |
| 21 | D3 | S3 | MUX SEL 3 | CONV 3 |
| 22 | D4 | S4 | MUX SEL 4 | CONV 4 |
| 23 | PARITY | PARITY | PARITY | PARITY |

SERIAL DATA TRANSMISSION BETWEEN REDUNDANT CHANNELS

The invention herein was made in the performance of work under NASA Contract No. NASA 2-11771 and is subject to the provisions of Section 305 of the National Aeronautics and Space Act of 1958 (72 Stat. 435; 42 U.S.C. 2457).

This is a continuation of application Ser. No. 07/574,575 filed on Aug. 28, 1990, now abandoned which was a continuation of application Ser. No. 06/924,642 filed on Oct. 29, 1986, now U.S. Pat. No. 4,959,782.

CROSS REFERENCE TO RELATED APPLICATIONS

The invention described herein may employ some of the teachings disclosed and claimed in commonly owned co-pending applications filed on even date herewith by Tulpule et al, entitled ACCESS ARBITRATION FOR AN INPUT/OUTPUT CONTROLLER Ser. No. 06/924,647, now U.S. Pat. No. 4,959,782, and Ser. No. 06/924,643, entitled GENERIC MULTI-MODE INPUT/OUTPUT CONTROLLER, which are hereby expressly incorporated by reference.

1. Technical Field

This invention relates to digital communication systems and, more particularly, to an input/output controller for gathering and distributing data in a digital control computer system.

2. Background Art

In most digital control computer systems, the gathering and distributing of data is a necessary activity that must be performed during each phase of computations. This activity is usually delegated and controlled by an Input/Output Controller (IOC). The IOC function contributes significantly to the system's overhead since its associated hardware and/or software elements diminish the overall performance and other capabilities of the system available for performing the primary control computer functions. The performance and other operational requirements of IOCs are usually quite demanding and vary widely from application to application. Consequently, there is a critical need in most digital control computer systems for a generic, efficient and flexible IOC that can meet the demanding and varying requirements of multiple applications with a low overhead.

The implementation of an IOC function may take on many forms. For example, an IOC might be constructed as a rather inflexible state machine microprogrammed in PROM and designed to perform the gathering of inputs and distribution of outputs in a predefined and repetitive manner. Such a state machine could then be specifically tailored, i.e., microprogrammed, to a particular mode of operation of the control computer system.

The resulting IOC, which would be simple to design, will operate in a predictable manner and meet the needs of most single mode operations. However, such an IOC would not meet the flexibility needs of a multimode control computer system in which the data elements and the gathering and distribution process itself must change either statically or dynamically. Hence, there is a need for more flexible input/output controllers which can retain some of the simplicity of the state machine approach.

At the other extreme, an IOC function might be implemented entirely in software, in an embedded software programmable microprocessor. However, it might be noted that the basic tasks of an IOC, namely, the movement of data between a set of sources and destinations and the control of I/O devices do not demand the complexities and complete flexibilities offered by a micro-processor in such a completely software based approach. Furthermore, the arithmetic and data manipulation capabilities of a microprocessor are not essential for the data transfer operation of an IOC. Thus, such a microprocessor-based IOC software tends to under utilize the microprocessor and, for this reason, the microprocessor in such an IOC usually ends up performing some of the primary control computing functions which, in turn, can tend to interfere with the IOC's primary I/O control capabilities.

The debate over which approach is better has been going on for some time and is not expected to be resolved here.

However, in many applications requiring extremely rapid control of devices, a microprocessor based approach is unsuitable. Some of the other difficulties associated with a microprocessor based IOC approach in this context are: (i) the need for design and verification of complex, high performance software, such as required by a real time system, (ii) the lack of autonomous, repeatable operations, and (iii) the usually larger failure rates of the associated hardware.

A state machine sequencer based IOC, on the other hand, can be easily microprogrammed in PROM and verified to perform a given set of data transfer and device control operations autonomously. However, as mentioned above, a state machine IOC is very inflexible and may not be cost effective in terms of hardware, particularly if it is designed using off-the-shelf I/O controller components.

In many systems, the IOC's are required to manage a special type of interface, namely, digital links. The management of these data links between many subsystems involves special capabilities unlike those required for managing localized analog or discrete signals and interfaces.

In a redundant control computer system, for example, a common task performed by an IOC involves the transfer of data over a serial data link to and from a set of redundant channels and (sub)systems which may or may not be computational frame or task synchronized. These transfers are required to be error free. The transfers are required to occur at certain specific times depending on events and usually involve a large number of input and output signals such as voting plane signals and signals indicative of intermediate results of computations.

An IOC, unlike a control processor, is not required to perform any sophisticated handling of data, in terms of command response protocol, data redundancy or consistency. What is required, in the context of redundant data links, is an autonomous internal bus between the IOC and a local processor's memory involving no control processor overhead in the transmission and reception of data to and from other channels and systems which may or may not be synchronized. Such a link interface IOC cannot be used for managing sophisticated data buses such as the MIL-STD-1553, LAN, etc., because they are always asynchronous and require sophisticated protocol and data consistency management which are best performed by a dedicated bus controller function embedded in a processor. Such sophisticated links also involve considerable hardware overhead.

The gathering and distribution of data by any IOC requires access to memory which is also being used by the control processor. This is most commonly done in a direct memory access (DMA) mode where the processor is requested access to the data/address buses and the data is transferred on receipt of a bus grant signal. During this transfer interval, the processor is essentially idle. This loss of real time by the processor linearly increases with the number of data transfers by the IOC, to a point where it can significantly affect the overall throughput capability of the host processor. Another difficulty with this DMA approach is that the bus grant signal is essentially asynchronous and may take more or less time depending upon the processor and its current activity. If the bus grant signal is held off for a long time, it can lead to loss of rapidly arriving internal bus messages, particularly if they are asynchronous in nature. A common solution to this problem is to buffer the incoming bus data. However, this approach has a significant hardware penalty and can only provide limited relief. Another, new approach, disclosed herein, involves the use of dual port RAMs which can internally arbitrate between two asynchronous data buses for memory accesses. However, this also has a significant hardware penalty and, though it fulfills the need for an autonomous bus between the IOC and the control processor's memory, it is not always affordable.

In summary, there is a need for an Input/Output Controller function by which data may be gathered and distributed and by which input/output devices including data links, synchronous or asynchronous in nature, are controlled in a flexible, autonomous and predictable manner without real time penalty to the host control computer in the channel.

DISCLOSURE OF THE INVENTION

An object of the present invention is to provide the control of data links, asynchronous or synchronous in nature, for the distribution and gathering of digital data to redundant or other elements of a system in a manner designed to provide flexibility, independence of communication format and detectability of signals, messages and events.

Another object of the present invention is to provide a generic multimode input/output controller (IOC) state machine which provides flexibility, autonomy, predictability and simplicity in the gathering and distributing of data.

According to a first aspect of the present invention, data is communicated between redundant channels formatted in blocks having an initial command word followed a code indicating its source or its intended destination in a memory bank partitioned according to source channel, a starting address and a variable number of data words. The blocks are transmitted between each channel and all of the channels over cross-channel data links. Upon reception, a stop address is generated for each block received for storage at the start address or its equivalent. Memory addresses are also generated for each data word received for storage in sequence starting immediately after the start address. The next block received has its start address placed immediately at the end of the previously received block.

According further to this first aspect of the present invention, an appropriate communication link such as a simple serial link, e.g., using Manchester or NRZ encoding, provides a sufficient degree of signal or protocol error detection capability built into the transmitter and receiver elements. Such buses are the ideal solution for an internal bus between redundant channels and systems because they provide some degree of error detection without the need for general purpose interfaces as in the case, e.g., of a MIL-STD-1553 bus. The transfer operations are controlled by the IOC which can be frame synchronized, if needed. However, these links, such as the Manchester link, do not provide the flexibility of a sophisticated link, such as MIL-STD-1553, in terms of distinguishing the sources and destinations or controlling and monitoring the number of data words sent in a message. In other words, each transmitted data item is received by all connected receivers in a redundant system.

The data link disclosed herein may be embodied in a serial, Manchester type link that significantly expands the capabilities of internal buses in terms of these and other difficulties. However, the control of the link transmitter and receiver functions by the IOC described in the patent does not depend on the specific protocol of the Manchester or any other links and is used here only to illustrate the concepts. The link provides the capability of sending a block message containing a variable number of words to a channel and placing them in desired locations. Each block of words begins with a command word (distinguished from data words by a different synchronizing pattern at the beginning of the word) to specify the destination identification and the starting (sub)address for the subsequent data words in the destination memory. The destination address may also be compared and validated using the local channel address before the message is considered acceptable. The starting address is then used by the receiver, in combination with the IOC, to generate the memory addresses for all subsequent data words within the memory address space (Link RAM) allocated for the source channel. As each new data word is received, the current address initialized to the starting address is updated and the data is placed in sequential locations pointed to by the value of the current address. The process is continued until all the data words have been deposited. When a new command word is received the process is then repeated starting at the location pointed to by the new starting address. The starting address is deposited immediately after the last data word of the last block.

The expected number of words in a block may also be placed in the block as the first data word and used to determine the valid reception of the complete block. Reception of an invalid block then freezes the link receiver operation and causes an interrupt which can then be used by the processor to identify and discard the invalid block by using the starting address and the block count.

This very powerful ability to selectively update a desired portion of another processor's memory in a fault-tolerent, asynchronous manner is a key teaching of the IOC disclosed herein. When utilized in conjunction with the menu select mode of the second aspect of the present invention, disclosed below, it in effect permits the host CPU to be decoupled from I/O processing so that there is no time relation between sequential memory locations and the reception of messages at memory locations of particular blocks.

In still further accord with this first aspect of the present invention, the IOC controller described herein is capable of mapping the data received from all redundant channels and other subsystems. This, for example, may involve use of a unique channel ID code (discrete inputs) which changes the RAM bank number to which each receiver's incoming data is mapped by the link controller.

The present invention satisfies, for redundant systems, the need for an autonomous internal bus requiring no control processor overhead in the transmission and reception of data between channels or systems which may or may not be synchronized. For example, a simple serial link using Manchester or NRZ encoding provide sufficient error detection capability which may be built into transmitter and receiver elements. Although the present invention is not limited thereto, this will, according to the present invention, in most cases, be the preferred internal bus between redundant channels and systems.

The throughput capabilities of each of the control processors are significantly enhanced without loss of flexibility, according to the present invention by performing some of each's tasks via the IOC and by eliminating the real time overhead associated with the DMA approach. The present invention provides an IOC that can operate synchronously or asynchronously in multiple modes using an autonomous internal bus requiring no control processor overhead in the transmission and reception of data to and from other channels and systems which may or may not be synchronized.

These and other objects, features and advantages of the present invention will become more apparent in light of the detailed description of a best mode embodiment thereof, as illustrated in the accompanying drawing.

BRIEF DESCRIPTION OF THE DRAWING

FIG. 2 is a block diagram illustration of an IOC Arbitration unit, such as is illustrated in FIG. 1;

FIG. 3 is another block diagram illustration of an arbitration unit such as is shown in FIG. 1;

BEST MODE FOR CARRYING OUT THE INVENTION

Figure 1:
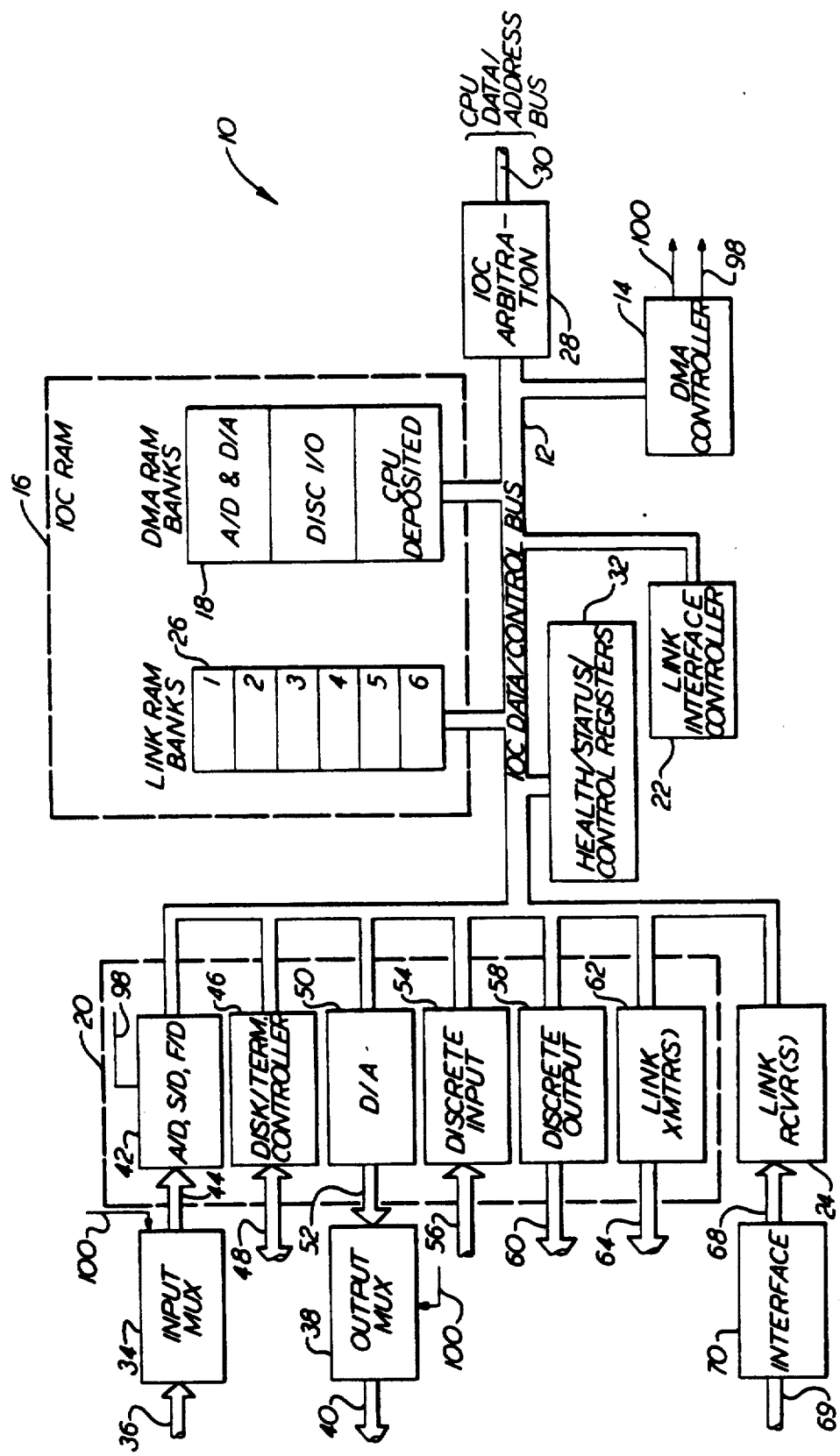
FIG. 1 is a functional block diagram of an input/output controller (IOC), according to the present invention.

FIG. 1 is a functional block diagram of an input/output controller (IOC) 10, according to the present invention. An IOC Data/Control Bus 12 is shown connected to various components of the IOC including a Direct Memory Access (DMA) controller 14 for controlling transfers between a DMA RAM Bank 18, within an IOC RAM 16 and a number of input/output devices 20 via the IOC Data/Control Bus 12; a link interface controller 22 for controlling transfers between a number of link receivers 24 and a partitioned link RAM Bank 26 via the IOC Data/Control Bus 12; an IOC Arbitration unit 28 for arbitrating access to the IOC RAM 16 as between a host CPU (not shown, which gains access to the IOC RAM via a CPU Data/Control Bus 30) and the controller portions of the IOC, i.e., either the DMA Controller 14 or the link interface controller 22. The CPU is always granted access priority and, in fact, the operation of the IOC, according to the present invention, is transparent to the CPU as described in more detail below.

The IOC 10 of FIG. 1 also include one or more Health/Status and control registers 32 for storing information concerning the present health, status and control of the IOC operations.

The DMA controller can control a variety of input/output devices such as those shown in FIG. 1. The devices 20 controlled by the DMA Controller 14 may include an input Multiplexer 34 responsive to a plurality of analog input signals from internal subsystems on an input line 36; an output Multiplexer 38 which provides analog output signals on a line 40 for use by external subsystems; a converter 42 responsive to analog input signals on a line 44 from the input Mux 34 for providing Analog/Digital, Synchro/Digital, or Frequency/Digital conversions; a Disk/Terminal Controller 46 for receiving digital data words signals on a line 48 from an external terminal/controller, and for providing digital data signals on the line 48 from the host CPU for the purpose of controlling the external subsystem; a Digital/Analog Converter 50 for converting digital signals from the IOC Data/Control Bus 12 into analog signals on a line 52 for distribution to external subsystems via the output Mux 38 for the purpose of controlling them; a discrete input signal conditioner 54 responsive to a plurality of discrete input signals on a line 56 from external subsystems for the purpose of monitoring their activities; a discrete output unit 58 for providing discrete signals on a line 60 to the external subsystems for the purpose of controlling them; one or more link transmitters 62 for providing serial output data on a plurality of serial output lines (links) 64 to the other channel(s) or subsystems in the system; one or more link receivers 24 responsive to a plurality of input signals 68 from links 69 from the various channels or other subsystems and as conditioned by interface 70. The interface unit 70 may be provided in conjunction with the link receiver(s) 24 for the purpose of conditioning the serial input data on lines 69 constructing the data words.

The IOC Link RAM Banks 26 may be partitioned into several memory spaces, each corresponding to one of the redundant channels or subsystems in the control system. The Link RAM Bank 26 shown in FIG. 1 has 6 such areas, indicating that there may be redundant channels or subsystems in the control system. The IOC DMA RAM Banks 18 may likewise be partitioned into an A/D & D/A section for storing the incoming and outgoing digital words, respectively; a discrete I/O section for storing the discrete words gathered and distributed; and, a CPU deposited section for the purpose of storing intermediate digital words to be transmitted to other subsystems.

As mentioned, the block diagram of FIG. 1 is merely a functional diagram and does not necessarily depict, nor should it be interpreted as limiting the IOC of the present invention to the exact interconnections or devices pictured in the IOC 10 of FIG. 1. For example, referring now to FIG. 2, the IOC Arbitration unit 28 may be set up such that the CPU Data/Address Bus 30 interfaces with a Multiplexer 74 and an Arbitration Logic unit 76 which arbitrates access to the DMA RAM Banks 18 as between the DMA Controller 14 and the host CPU. As mentioned above, the host CPU is always granted access. However, any CPU accesses which might consume more than one machine cycle are disallowed. When the DMA Controller 14 requests an access on a line 16, it is granted access to the DMA RAM Banks 18 only if the Arbitration Logic 76 is certain that the CPU will not be requesting access during the time that it takes for the DMA Controller 14 to gain the requested access and complete its task.

Similarly, the IOC Data/Control Bus 12 of FIG. 1 can be thought of slightly differently, as shown in FIG. 3 with respect to the Link RAM Banks 26, while still retaining functional equivalency to the arrangement shown in FIG. 1. Thus, the Link Interface Controller 22 receives data from Link receivers 24 and requests access by means of a request signal on a line 78 of the IOC Arbitration unit 28. If the CPU Data/Address Bus 30 is not requesting access to the Link RAM Banks 26 and will not be doing so during the time that it will take for the Link Interface Controller 22 to gain access and complete its task, then Arbitration Logic 80 will grant access via a multiplexer 82.

Thus, it will be observed that the functional block diagram of FIG. 1 may be arranged and rearranged in various ways to accomplish the same ends. Therefore, it will be understood by those skilled in the art, that the teachings contained herein may be implemented in a wide variety of IOC structures and architectures. The basic teachings disclosed herein, however, will still be present. In connection with this thought, it will be observed at this time that the architectures disclosed in FIGS. 4 and 6 for, respectively, a DMA Controller and a Link Interface Controller are similarly merely two examples of many such architectures which could be constructed using the teachings of the present invention.

Figure 4:
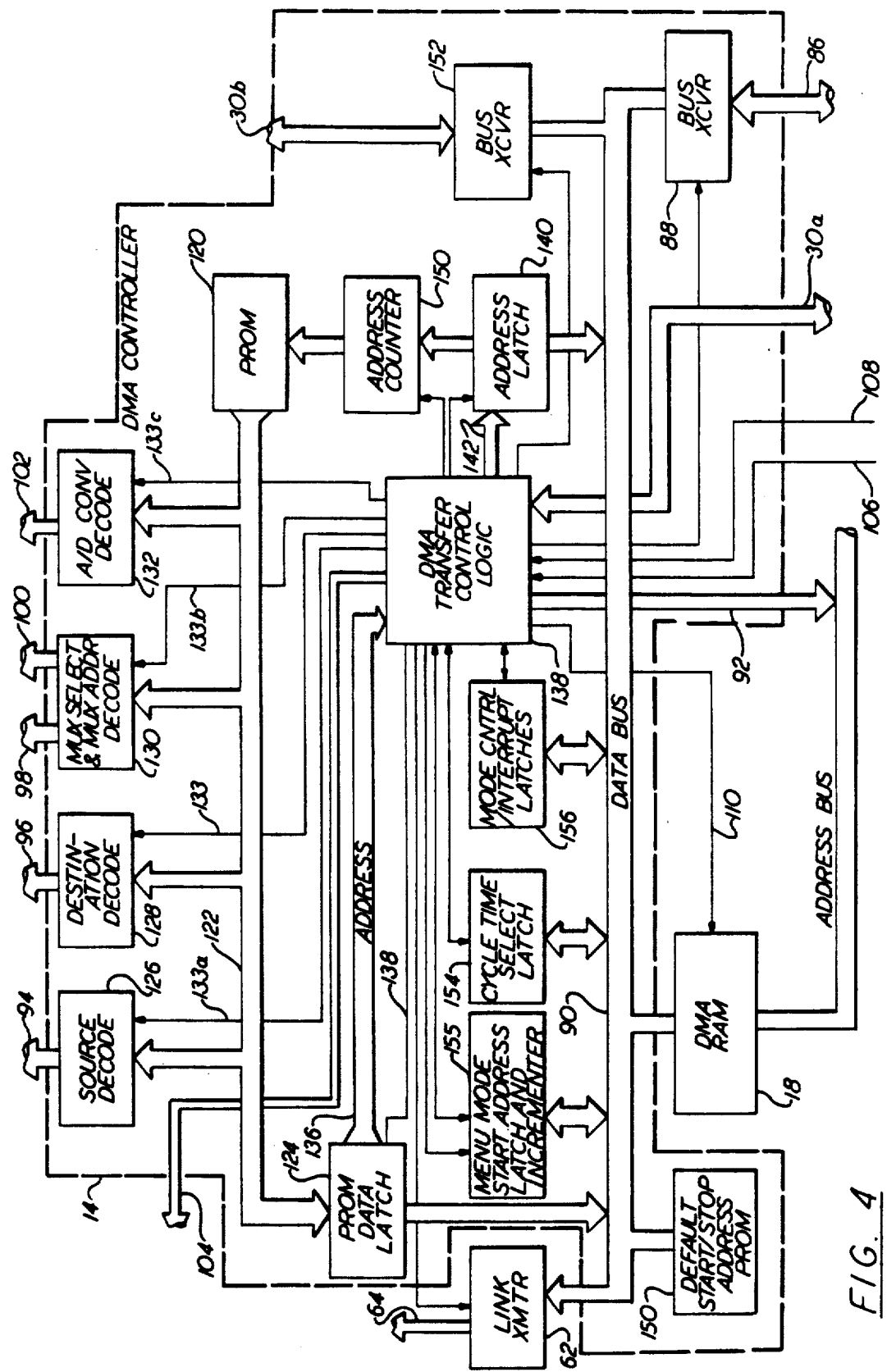
FIG. 4 is a block diagram illustration of a DMA controller, such as is shown in FIG. 1.

Referring now to FIG. 4, a DMA Controller 14 is there illustrated in simplified block diagram form. A DMA RAM 18 is illustrated interfacing with the DMA Controller 14, as in FIGS. 1 and 2, except with a different architecture. Of course, as mentioned above, the teachings contained herein will be broadly applicable to a wide variety of DMA controller architectures not necessarily restricted to those disclosed in FIGS. 1, 2 and 4.

The main function of the DMA Controller 14, or "PROM Sequencer," is the transfer of data between I/O devices over an I/O data bus 86 and the DMA RAM 18 and/or the Link Transmitter(s) 62. Thus, it will be understood that the I/O data bus 86 of FIG. 4 is functionally comparable to the input/output lines 36, 40, 44, 48, 52, 56, 60 and 64 of FIG. 1. Thus, the bus transceiver 88 in FIG. 4 will be connected to the devices 20 of FIG. 1. The IOC Data/Control Bus 12 of FIG. 1 is comparable to a data bus 90, an address bus 92 and a number of control busses and signals including lines 94, 96, 98, 100, 102, 104, 106, 108, and 110, to be described in more detail below. A CPU address bus 30a and a CPU data bus 30b are together comparable to the CPU Data/Address Bus 30 of FIGS. 1 and 2.

The DMA Controller 14, in the embodiment shown herein, is capable of controlling up to 32 source and 32 destination devices as constrained, in the particular embodiment shown, by the 5 bits (S0-4 and D0-4, respectively) dedicated for this purpose (see FIG. 5) in the RAM READ and RAM WRITE operations to be described below.

Figures 5, 9:
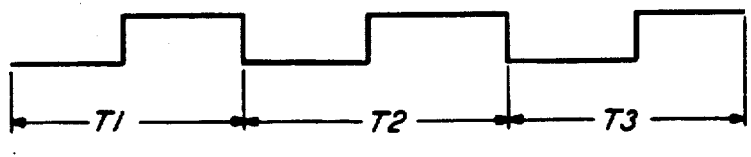
FIG. 5 is one example of a microcode word format and the types of fields that can be used for bit mapping each of the categories selected to meet the needs of a particular application.
FIG. 9 is an illustration of three clock periods, corresponding to one machine cycle of a particular signal processor.

The PROM Sequencer or DMA Controller 14 is implemented as a state machine that generates address and control signals from the microcode defined in FIG. 5 which may be resident in PROM 120. Sequencer operations can be organized into sequences of microcoded words of variable sizes. These micro sequences can be chained together either sequentially (default mode), selectively (menu mode) or individually (direct mode) to form longer sequences of IOC operations. A default block occupies a fixed address locations in the PROM 120.

Each microcoded operation may be defined by a 24-bit-wide word, as described for but not limited by the particular embodiment disclosed. It should also be noted that the format of the microcode word of FIG. 5 is an example of the types of fields that can be used. The size, definition or range of possible operations is certainly not limited to those disclosed in FIG. 5 and can be tailored to meet the specific needs of the application. There are 4 catagories of operations disclosed for the particular embodiment illustrated:

(1) RAM Read/Destination transfer;
 (2) RAM Write/Source transfer;
 (3) Mux select; and
 (4) Task control.

It should further be noted that the categories of operations described in the embodiment disclosed are for the purpose of illustration only. They can certainly be combined differently or separated or further enhanced by additional operational categories within the scope of the invention disclosed herein. For example, a link receiver can be managed using a separate category for transferring data to RAM at locations specified in the microcode. This feature is particularly convenient for synchronous links but can also be used for asynchronous link receivers of any type by permitting update of RAM only when a valid word is received.

Bit mapping for each of the four catagories is shown in four separate columns of 24 bits each in FIG. 5. As noted above, the bit mapping fields shown in FIG. 5 could be expanded, contracted or combined differently to meet the needs of particular applications and such structures are entirely within the scope of this invention. It will be noted that bits 18-22 of the RAM READ and the RAM WRITE columns correspond to the five source and destination bits which permit 32 devices to be controlled by the sequencer, as described above.

The address and control signals are provided by a PROM 120 on a line 122 to various devices including a PROM Data Latch 124, a Source Decode 126, a Destination Decode 128, a Multiplexer Select and Multiplexer Address Decode 130 and an Analog/Digital Converter and Decoder 132.

For a RAM READ operation, the Decode unit 128 is activated by a signal on a line 133 and the destination bits 18-22 are decoded in the Destination Decode unit 128 and one of a plurality of destination strobe lines in line 96 is activated to enable a particular destination device as designated by one of the 32 possible destination codes provided by it 18-22. Of course, the destination decode function could be carried out outside the DMA Controller 14 and the signals in line 96 could correspond to 5 signal lines each carrying one of 5 bits for decoding elsewhere. In that case, the Destination Decode 128 would be replaced by, for example, a buffer for holding the bit values.

Similarly, for a RAM WRITE operation, the Source Decode Unit 126 is activated by a signal on line 133a and the PROM 120 provides an address and control signal on lines 122 which are decoded by the Source Decode unit 126, which in turn provides source strobe signal lines in the line 94 to activate that source device which will be sending data for storage in DMA RAM 18 via signal lines in line 86. It should be noted that a RAM WRITE operation can also be used for collecting data from a synchronously operating link receiver, similar to the receiver 24 pictured in FIG. 1, using a unique source code and depositing it into the specified RAM location, also via line 86.

The Multiplexer Select and Multiplexer Address Decode unit 130 activated by a signal on a line 133b and is responsive to a Mux Select operation as defined by words similar to that shown in the third operational column of FIG. 5, i.e., the "MUX" column. There, one of the converters shown in block 42 of FIG. 1 may be selected using mux source strobe lines in lines 98. Similarly, one of the I/O mux busses 36, 40 of FIG. 1 could be selected using strobe lines in lines 100. Similarly, if one of the input muxes 34 is selected it will be strobed using strobe lines in line 100.

The A/D Converter Decode unit 132 of FIG. 4 is activated by a signal on a line 133c and is responsive to a Task Control operation as defined by a CONTROL word corresponding to column 4 of FIG. 5. Units 46, 50, 54 and 58 of FIG. 1 are considered as sources and destinations and therefore require a source and/or destination strobe for control.

The PROM Sequencer 120 is programmed to provide the required sequence of events to perform each of the system defined I/O transfers. The events are strung together to form blocks, identified by an end of block bit in the last event. The blocks are then chained together to form a sequence of I/O operations.

The function of the PROM Data Latch 124 is to demultiplex, e.g., an 8-bit wide data bus 122 to form 24-bit words as defined in FIG. 5, and it provides, for RAM read/write operations, a 12 bit address on lines 136 to access any location in the DMA RAM 18 via a Control Logic unit 138 which provides the necessary address onto the address bus 92 to the DMA RAM, with the capability to be offset by an appropriate amount.

It will be noted in FIG. 5 that bit 3 of the first two columns corresponds to a link transmit operation. With this bit set, data transfers between a destination/source and DMA RAM will be simultaneously transmitted by a Link Transmitter 62 over cross-channel data links 64 to all of the channels or subsystems. Such a transfer between a source, and the link will always result in a write operation, in the present embodiment, to DMA RAM whether one is required or not. For example, in the Default mode, in which a Default start/stop address PROM 150 is in control, link start and stop addresses are read from the address PROM 150 (treated as a source) and deposited on the links 64. A write to DMA RAM is not required but it will occur automatically. Therefore, a minimum of two locations in the host CPU deposited portion of DMA RAM is dedicated for these types of operations, in the embodiment shown in FIG. 4.

The first two link operations within any block message must transmit the link RAM start and stop addresses for that block. The start address is transmitted with the command sync enabled. The link receiver control circuitry in the receiving channel decodes the sync character and interprets it as the start of a new block of link operations.

Referring to FIG. 5, it will be noted that bit 4 of the CONTROL column contains an End of Frame (EOF) which is programmed by the host CPU to be set at the end of all macroframe sequences. In other words, at the end of a macroframe, the host CPU transmits a control word over the CPU Address Bus 30a into the control logic 138 which in turn provides the address latch 140 with the control word which is in turn passed to an address counter 150 which provides the control word to the PROM sequencer 120. When decoded, the sequencer halts and waits for macrosync to reinitiate the sequence (e.g., default or menu select modes, to be described in detail below). EOF also forces the link transmitter output lines to the logic levels which represent the start of a command sync, thereby distinctively marking interframe gaps on the data links (inter word gaps are identified by placing the logic levels which represent the start of a data sync on the transmitter output lines).

It will be observed by examining bit 16 of each of the columns of FIG. 5 that an End of Block (EOB) bit may be set in any of the four operational categories. This bit is ignored in the default mode which allows a sequence of blocks to execute automatically. In the menu select mode (to be described below), an EOB causes the sequencer to fetch the next block pointer from a RAM block pointer table. For a CPU Block Select mode (to be described below), the sequencer waits for the CPU to initiate the next block sequence.

When a control operation is executed with the RTI bit (bit 17) set, a real time interrupt is generated by the control logic as indicated by a plurality of signals (not shown) within a line 104. The RTI may be programmed at the end of a block sequence to signal the host CPU that the block sequence has completed.

Each micro coded operation contains a parity bit (bit 23) which is set to produce odd parity across the entire 24 bit word (including the parity bit).

The PROM sequencer 120 operates with a fixed operation cycle time that is CPU programmable, in this embodiment, from 3 to 10 microseconds, in one microsecond increments. In this connection, the host CPU may write, via the CPU Data Bus 30b and a bus transceiver 152 to the Data Bus 90 for deposit in a Cycle Time Select Latch 154. The sequencer PROM address counter 150 is updated at the rate specified by the cycle time latch 154. The cycle time defaults to 5 microseconds following the presence of a power-on-reset (POR) signal on a line 106 being indicative of the system just being turned on.

The maximum block size, i.e., the maximum number of words in a block is determined by the macroframe size, i.e., the time between macrosync pulses and the selected sequencer cycle time. For example, with a macroframe (mf) of 12.5 milliseconds and a cycle time (ct) of 3 microseconds, the total number of operations that can be executed, exclusive of link to RAM transfers, in a single block would be equal to mf/ct or 4166.

Minimum block size is 4 words for the embodiment shown in FIG. 4.

The PROM sequencer can operate in any of the following operational modes:
 (1) Default (autonomous);
 (2) CPU Block Select;
 (3) Menu Select; and
 (4) PROM Verify.

The CPU selects the mode by writing to a Mode Control Latch 156. Mode programming can occur at any time. However, the mode change will actually occur at the next macrosync pulse. New mode sequences commence at macrosync for the Default and Menu modes and when initiated by the CPU following an EOF in the Block Select mode.

The Default mode is entered via CPU selection or automatically upon channel power-on-reset (POR). A default block of operations is initiated by macrosync and continues until EOF occurs. The sequencer halts until another macrosync reinitiates the cycle. Link operations may be partitioned into as many as 8 subgroups in the default mode, in the present embodiment, to eliminate the need to wait until the end of the macroframe before detecting and declaring faulty link transfers.

In the CPU, or table driven modes, the only restriction is that each block must contain at least one data word. The Link RAM start and stop addresses for each subgroup are contained in the Default Start/Stop Address PROM and are accessed using a source-to-link transfer operation in the sequencer PROM.

In the CPU Block Select mode, the CPU initiates a block sequence by writing a PROM block pointer to the PROM Address Latch 140 via CPU Address Bus 30a, the control logic 138 and lines 142. Once initiated, the block operations continue until an EOB stops the sequencer. To initiate another sequence, the CPU writes the block sequence start address to the PROM address latch 140. The RTI signal on line 104 may be used to signal the CPU that the block sequence is complete.

The CPU can select a menu of block sequences to be executed automatically during the macroframe. The sequencer cycles through a RAM table (which is located in the DMA RAM bank) of PROM block pointers. The CPU writes the address of the first entry in the RAM table to a Menu Mode Start Address Latch and Incrementer 155 (while in another mode or with DMA disabled). At macrosync, the sequencer obtains the first two entries in the RAM table and begins executing the operations associated with the first block pointer. When EOB occurs, the sequencer starts on the next block and at the same time fetches the start address of the subsequent block from the RAM table. This cycle continues until EOF occurs, forcing the sequencer to halt and wait for the next macrosync to restart at the beginning of the menu. Because the sequencer also pre-fetchs the next block pointer following an EOF, the last entry in the table must contain a valid block pointer such as the default start address.

In the PROM verify mode the CPU may write the address of any sequencer PROM location to the PROM Address Latch 140. The CPU may then read the data stored at that PROM location.

If link operations are included in a block sequence, they must meet the criteria of having the first two link operations within any block transmitting start and stop addresses to link RAM for the block. The start address is transmitted with the command sync enabled. The link receiver control circuitry decodes the sync character and interprets it as the start of a new block of link operations. The address embedded in the RAM READ microcode points to a table location in DMA RAM that contains the Link RAM start and stop addresses for each block. In the default mode the start/stop addresses are located in PROM 150.

The DMA RAM 18, for the embodiment of FIG. 4, is allocated for 4K × 16 bits, mapped on any one K boundary. The memory is fully protected for parity with parity errors logged in an interrupt status latch 156. Bus arbitration, to be described in more detail below, allows the CPU access to read or write any location in the RAM without loss of real time.

The sequencer detects the following fault conditions:
 PROM parity
 RAM parity
 DMA RAM time-out
 Menu table pointer
 Software timer A DMA RAM time-out fault will occur if the sequencer cannot gain access to the DMA RAM during the time allotted for that operation.

In a similar manner, a menu table pointer fault occurs when the sequencer attempts to read a block pointer from the menu table and cannot gain access to DMA RAM (Menu Table mode).

For each of the above faults, an interrupt is generated on line 104 and the sequencer continues to operate. For menu table pointer faults, the sequencer halts and waits for the next macrosync to restart.

Interrupt status information is available to the CPU via the Interrupt Status register 156. Interrupts are enabled/disabled via an Interrupt Enable register (not shown). An interrupt is not generated for A/D and S/D conversion faults. However, a fault bit will be sent in the least significant bit of the A/D or S/D data word.

Figure 6:
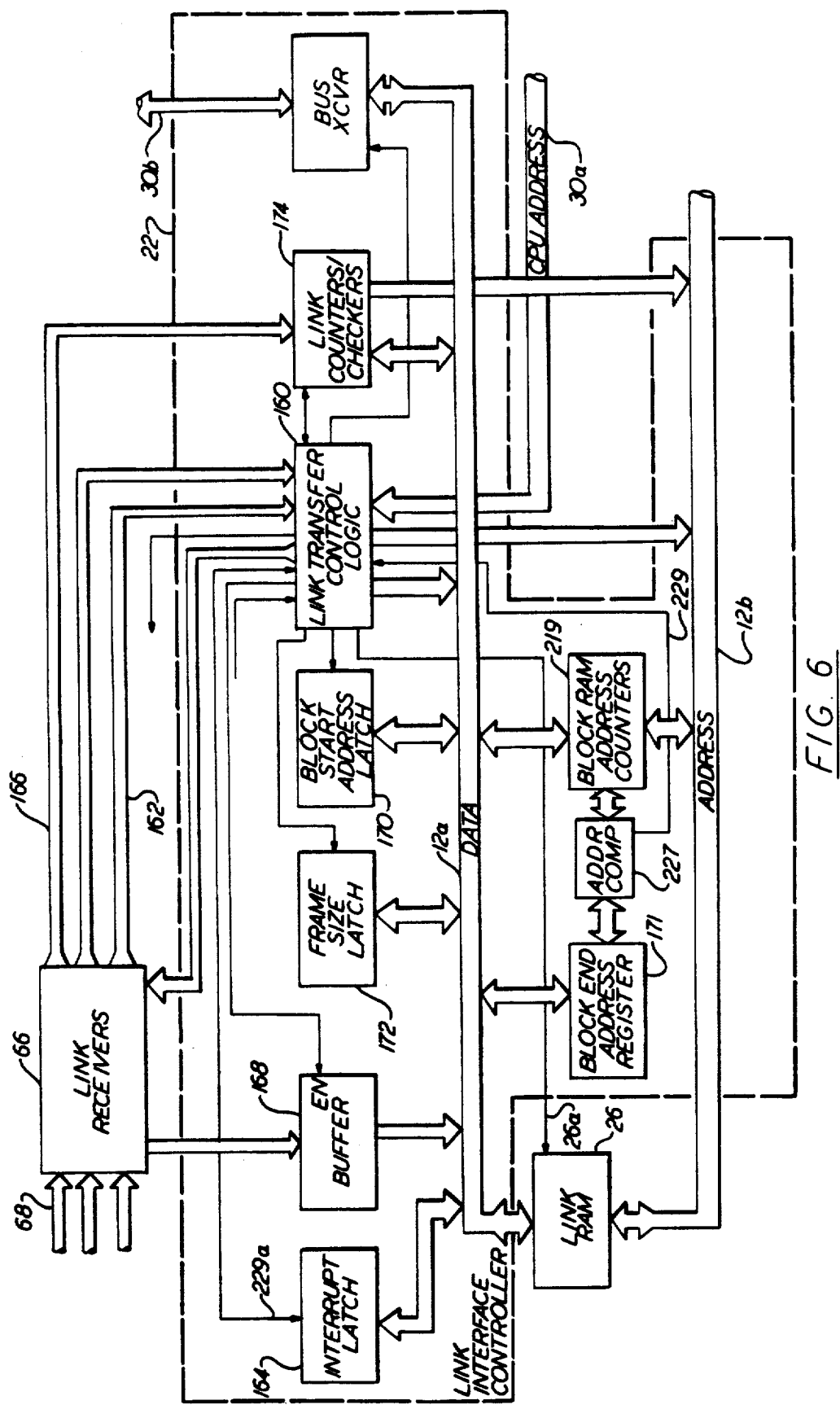
FIG. 6 is a block diagram illustration of a link interface controller, such as is shown in FIG. 1.

Referring now to FIG. 6, an embodiment of the function of the Link Interface Controller 22 of FIG. 1 is described in detail. Of course, it will be understood that many other embodiments are possible. The CPU Data/Address Bus 30 of FIG. 1 is shown as two separate CPU Address and Data buses 30a, 30b. The IOC Data/Control Bus 12 of FIG. 1 is similarly shown split into two separate Data and Address busses 12a, 12b. The IOC Arbitration 28 function of FIG. 1 and the similar arbitration logic function 80 of FIG. 3 may be thought of, in FIG. 6 as functionally contained in a Transfer Control 160.

The following description of a link controller's operation is specifically oriented to a Manchester link protocol. However, as pointed out earlier, the techniques disclosed here are widely applicable to any other link protocol and such other link protocols are therefore entirely within the scope of the present invention. The link controller of FIG. 6 can transfer data from any asynchronously operating links to the link RAM. Clearly, synchronously operating links may be handled as a subset. Synchronously operating links can also be handled by the DMA Controller and mapped to unique RAM addresses, as described earlier.

The transfer of data from the cross-channel data links to Link RAM 26 may be an asynchronous operation initiated by the receipt of a transfer request on one of a plurality of lines 162 from an associated link receiver.

The link receiver 24 may include several separate link receivers each operating at its own unique frequency. For example, a link receiver with Manchester protocol may operate at one MHz and each decodes the 20 bit Manchester serial transmissions received over the plurality of data links 68. Each Manchester data word consists of the following:

3 bit period sync symbol followed by,
16 data bits followed by, 1 parity bit.

Each receiver generates a transfer request on one of the lines 162 (a word clock) to the link controller 22 following the detection of a valid sync pulse and a data word, irrespective of the data word validity.

The Link Receivers 24 will detect the following fault conditions and inhibit the transfer of a faulted data word to Link RAM:

Received data not valid (Manchester or parity)
Multiple receptions.

The occurrence of either of these conditions need not disable transfer of the next valid word from the particular link 68. A link fault also generates an interrupt to the CPU via a fault status register (interrupt latch 164). The fault bits are cleared by the CPU. The CPU may also enable and disable transfers from the link receivers by programming the receiver enable/disable register.

In the case of the failure of one of the link receivers, in case of a loss of power in another channel, transfers of data to the associated block of Link RAM can be disabled and the CPU interrupted by blocking transfer to the RAM at the discretion of the CUP. The CPU must reenable the corresponding link to remove the write protection. The link receivers detect the presence of a command sync and generate a strobe on a line 166 to initialize the link RAM address counters.

The first two link operations within a block define the start and stop addresses in RAM allocated for link operations within that block and are also the first two data words transferred to the Link RAM 26 via a buffer 168. The start address is also transmitted as a command word and is stored in the Block Start Address Latch which can be read by the CPU to determine the current word and block being updated.

When the Link Controller receives a command sync strobe on a line 166, the associated link RAM address counter 174 is initialized to the value of the received data word plus a link frame size offset to produce a link RAM address. Because the address counter is set to zero following POR, the first command word shall be stored at a RAM location that is equivalent to the frame offset.

In the embodiment shown in FIG. 6, frame size is externally programmable from 128 to 1,024 in increments of 128. This information is latched in a frame size latch which is kept the same after POR.

The stop address is stored in the block end address latch 171 and is compared via a comparator 227 to the current link address in a block RAM address counter 219 to detect missing link words or overrun of the allowed block size. A block validity fault is declared by the transfer controller 16 on a line 229a in response to a signal on a line 229 when the current RAM address equals zero and the next word does not have a command sync, or when the current RAM address is not zero and the next word has a command sync. A block validity fault also occurs when the current link address is equal to or exceeds the allowed frame size. Block faults generate an interrupt via the interrupt latch 164 and disable transfers via line 26a, until the CPU reads the failed block start address latch 170 and reenables the corresponding Link Transfer Control 160 logic. Transfers will then tart when the next command sync is detected.

Figure 7:
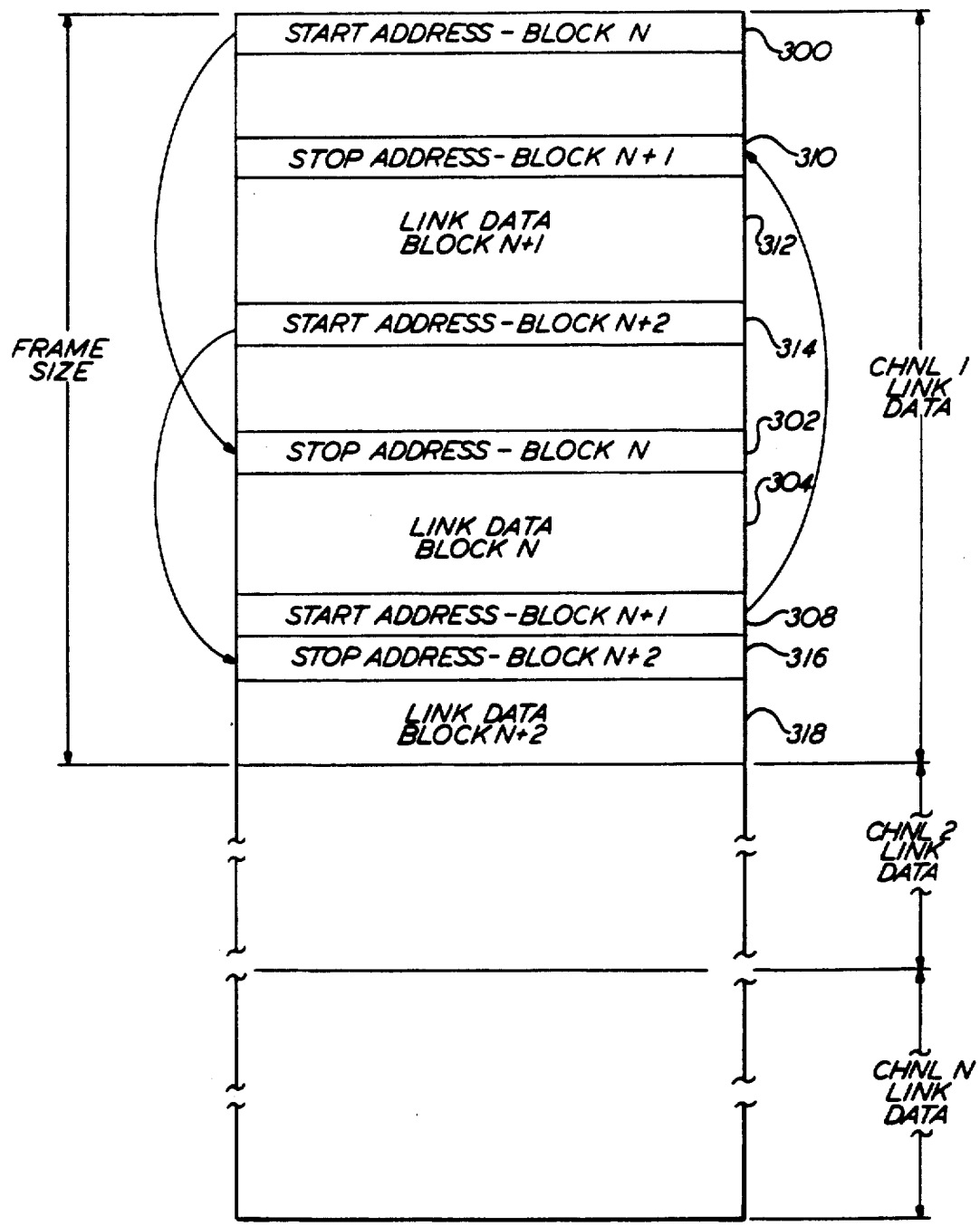
FIG. 7 is a pictorial representation of the manner in which data may be stored in Link RAM.

In the embodiment shown in FIG. 6, the maximum link RAM allocation is 8K×16 mapped in any 1K boundary with a depth of 128 to 1,023 contiguous locations per link. The memory is fully protected for odd parity With parity errors logged in the interrupt status register 164. Bus arbitration by the Transfer Control 160 allows the CPU access to read/write any location in Link RAM 26 without loss of real time. No internal block transfers within this Link RAM are permitted to be performed. I.e., such transfers are disallowed. RAM mapping is shown in FIG. 7.

The transfer control 160 logic performs the following tasks:

(1) prioritizes the transfer requests from the link receivers and generates link read commands when the receiver signals that a valid word, consistent with the protocol of the link has been received;
(2) inhibits transfer of invalid data to RAM by energizing the disable transfer line 26a;
(3) arbitrates access to the RAM data and address buses by monitoring the current and immediately anticipated activity of the CPU and accessing the buses only when assured of no conflict with the CPU operation during the time necessary to execute the transfer; and
(4) inhibits data transfer to RAM when block errors are detected by energizing the disable transfer line 26a.

When a transfer request is received, the link data is read from the receiver and stored at the location indicated by an address counter 174, provided the data meets the validity criteria specified previously. In either case, the address counter 174 is incremented, pointing to the next available RAM location.

The IOC disclosed herein is also capable of monitoring and detecting link faults and logging and generating fault messages for interrupting the CPU, if enabled. Specifically, these faults include but are not limited to the following:

Link receiver faults (24)
Block validity (160)
Link RAM parity (RAM parity generator not shown)

Figure 8:
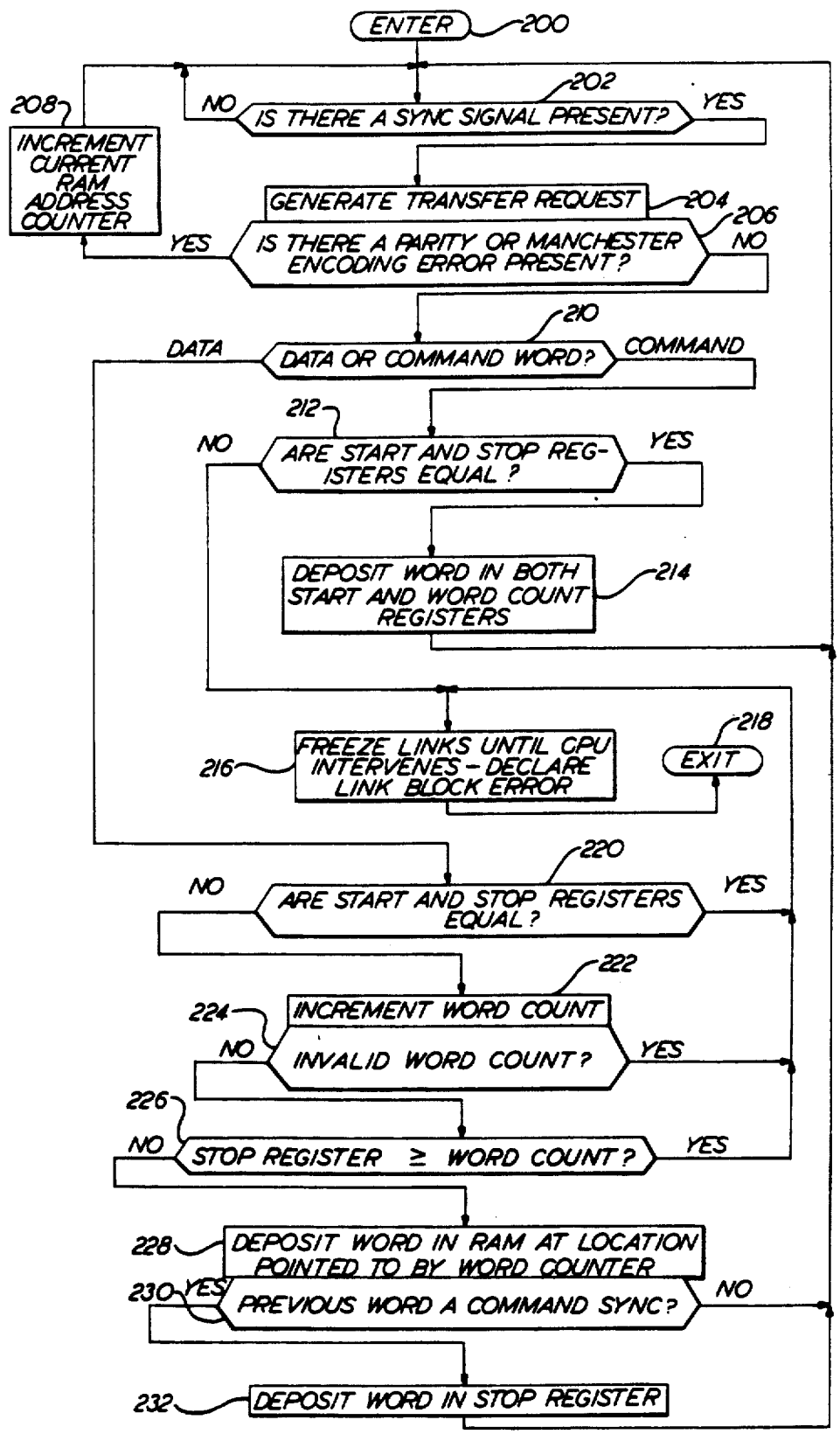
FIG. 8 is a simplified flow chart illustration of the manner in which data is received and handled by the Link Interface Controller of FIGS. 1 and 6.

Referring now to FIG. 8, the manner in which data is received and handled by the Link Interface Controller 22 of FIG. 6 and the manner in which it is stored in Link RAM 26, as illustrated in FIG. 7, will be described in more detail. After entering at a step 200, a step 202 is next executed in which a determination is made as to whether or not a sync signal is present. If not, step 202 is reexecuted until a sync signal is detected and a step 204 is next executed in which a transfer request is generated over one of the plurality of lines 162 of FIG. 6. A step 206 is next executed in which a determination is made as to whether or not a parity or Manchester encoding error is present or not. If so, the current RAM address is incremented in a step 208 and step 202 is next executed, as before. If there is no error detected in step 206, a step 210 is next executed in which a determination is made as to whether the detected sync signal indicates a data or command word. If a command word has been detected, a step 212 is next executed in which a determination is made as to whether the magnitudes of a start and stop latches 170 and 11 are equal. If equal , the command word is deposited in both the Block Start Address Latch 170 and a word count register (contained in Block RAM Address Counters 219 of FIG. 6) as indicated in a step 214. Step 202 is next executed, as before if it was determined in step 212 that the start and stop registers are not equal, then this indicates that a block error has occurred. It will then be necessary in a step 216 to freeze the link until the CPU intervenes and reads the start address latch to determine the last word received on the link. A link block error is also declared and stored in the interrupt latch 164 and an exit is made in a step 218.

If, on the other hand, a data word had been detected in step 210, a step 220 would have been executed instead of step 212 in order to determine whether the start and stop registers a e equal, but for a different purpose. The start/stop latches should be equal when a command word is sent but should be unequal for a later word. If equal, the step 216 is next executed in which the links are frozen until CPU intervention and a link block error is declared. An exit is then made in step 218.

If the start and stop registers are not equal, a word count register contained in Block RAM Address Counters 219 of FIG. 6 is incremented. A step 224 is next executed in which a determination is made as to whether or not the word count is invalid. If so, step 226 is next executed in which a determination is made as to whether or not the contents of the stop register 171 (which contains the block size information which was transmitted as the second word in the block) is greater than or equal to the word count contained in the Block RAM Address Counter 219. If so, steps 216 and 218 are executed as before. If not, a step 228 is next executed in which the data word is deposited in Link RAM 26 at a location pointed to be the word counter located in unit 174. A step 230 is next executed in which a determination is made as to whether or not the word just preceeding the present word was a command sync. This is necessary in order to determine whether the present word contains a word count. If not, step 202 is next executed, as before. If so, then the word count is deposited in the STOP register located in unit 174 as indicated by a step 232. Step 202 is then reexecuted, as before.

Referring back to FIG. 7, it will be observed that the first start address 300 deposited from the first command word received after POR is deposited in the first location in a particular channel's allocated RAM space. This start address points to another address 302 in the channel's space at which the next word is deposited, containing the stop address or word count for block N. The remaining data words 304 in block N are then deposited sequentially after this point. A start address 308 from the next asynchronously received command word would be deposited at the end of the previous block 304. This is indicated in FIG. 7 by a start address 308 for block N+1. As before, this start address will point to another address 310 in the channel's RAM space for depositing the STOP address or word count for block N+1. This is deposited in the indicated place 310 and additional data words 312 from block N+1 are then sequentially deposited after that location. Similarly, for the next block (N+2) the start address 314 is placed right after the end of the previous block. It also points to a depository for the stop address 316 in the channel's allocated space. The link data 318 for the N+2 block is then deposited after that stop address 316.

As known in the art, modern microprocessors will all have a minimum machine cycle. A machine cycle is a basic operation such as a memory read or write, an input/output device read or write, an interrupt acknowledge or an internal cycle (register to register operation). For example, in the Zilog Z8000 CPU, there will be found a minimum machine cycle of 3 clocks. For that processor. running at 10 MHz, each clock has a duration of 1)· nanoseconds. Under most conditions this period of one machine cycle is a "safe" period for the IOC, in the sense that if a processor were fetching, e.g., a word or, better still, an instruction, then the processor will not be in a position to access any other portion of memory during the same memory cycle. The IOC can then access the DMA RAM 18 or link RAM 26 and execute its transfer operation (read or write), if it is fast enough to complete its task well inside the machine cycle of the processor. Such a transfer will then be truly transparent to the CPU. This technique is a key teaching of the present invention. Thus, as illustrated in FIG. 9, 3 such clock periods, corresponding to one machine cycle for a Z8000 CPU, will last for 300 nanoseconds.

However, if one studies the instruction set available for a processor, one may find certain operations which will require access to a specific address or address block for multiple machine cycles without reference to any other address. In other words, the processor will not release access to that area of memory for many machine cycle. For example, in the Zilog Z8000 CPU Instruction Set there are various Block Transfer and String Manipulation Instructions that provide a full complement of string comparison, string translation and block transfer functions. If a block transfer operation that moved a block of memory inside of the DMA or link RAM banks to another block of memory also inside the DMA or Link RAM banks the IOC would be denied access to such RAM until the block transfer was completed, thereby creating potentially unacceptable conditions for the IOC operation. These conditions involve cases were the IOC has an urgent need to perform a series of transfers (such as link messages to RAM) at high speed and the IOC cannot wait for the CPU because it may lose the rapidly arriving data items. It is possible to double-buffer the data items but this can be an expensive hardware solution and provides only limited relief. There are only two possible solutions: (1) disallow such instructions for IOC RAM, or (2) use a dual port RAM (DPR) where memory access is arbitrated on an address by address basis.

If this first approach of disallowing these operations is taken, the IOC Controller 10 can be designed to wait for the beginning of each machine cycle to determine, using the arbitration logic 28, 76, 80, 138, 160, if the CPU is going to access Link RAM 26 or DMA RAM 18 during the remainder of the present machine cycle and/or any subsequent machine cycles. Clearly, this wait period is unnecessary, using the second approach, based on a DPR. In any case, after this determination is made, the IOC Controller 10 is free to access the IOC RAM only during the safe periods indicated by the lack of use by the host CPU. This is a key teaching of the present invention and provides a simple, cost effective method of IOC operations transparent to the CPU, as described earlier.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A method for use in each channel (10) of a redundant channel control system for gathering and communicating redundant data signals between channels over cross-channel data links (64, 69), the method comprising the steps of:

gathering one or more data signals (36, 48, 56 or 30) by means of one or more corresponding devices (42, 46, 54 or 28);

storing the gathered data signals as data words in input/output (I/O) memory (18) under the control of a Direct Memory Access Controller (14) for transmission over the cross-channel data link (64);

transferring data words from the I/O memory (18) to a link transmitter (62) under the control of a link interface controller (22) for said transmission;

formatting the data words in data blocks, each block having an initial command word having a command word identifier protocol followed by an origination code and a starting address, the command word followed by a variable number of other words, the first other word having a data word identifier protocol followed by a word count, the second and remaining other words each having a data word identifier protocol followed by data words;

transmitting the transferred data words in the formatted blocks from the link transmitter to link receivers (24) in all of the channels over the cross-channel data links;

receiving the transmitted data word blocks in the link receiver;

providing, by means of the link interface controller, memory address signals for storing the received data words in link memory (26) allocated according to the channel from which the associated block of data words originated and for storing the starting address in link memory in the next available sequential memory location after the end of the previously received block for providing a stop address according to the starting address plus the word count and for storing in link memory the stop address at the starting address and for storing, in link memory, each subsequently received data word of the block sequentially after the starting address.

2. A method for use in each channel (10) of a redundant method control system for communicating redundant data between a plurality of channels, comprising the steps of:

gathering channel-related data by means of one or more types of devices (42, 46, 54, Or 28) for transmission in blocks of data words;

transmitting said blocks to the other ones of the plurality of channels by means of a link transmitter (62) over cross-channel data links (64);

receiving transmitted blocks from other channels by means of a link receiver (24);

storing received blocks in channel memory, allocated by channel, by means of a link controller (22) wherein each received block has one or more initial word signals at least having a group of channel origination code signal bits ("origination code"), a number of start address signal bits ("start address pointer") and a series of word count signal bits ("word count"), all remaining data words of each block each having a group of data signal bits, wherein said step of storing a received block comprises:

storing the "start address pointer" obtained from each received data block at the next available memory location following the last block stored in a subsection of memory corresponding to the origin of the data block received as indicated by the "origination code";

generating a stop address pointer by adding the magnitude of the "start address pointer" to the "word count";

storing the stop address pointer at the address ("start address") pointed to by the "start address pointer"; and storing subsequently received data words in the corresponding data block at sequential memory locations after the "start address".

3. A memory storage method for use in a redundant channel control system for storing received data words grouped in blocks transmitted from a channel to other channels, comprising the steps of:

receiving, by means of a link receiver (24) in each channel, a data block transmitted from any of the redundant channels;

determining, in a link controller (22), the channel from which the received data block originated; and storing, by means of the link controller (22), the received block of data words in a link memory (26) allocated according to the determination of channel original wherein each block has one or more initial word signals at least having a group of channel origination code signal bits ("origination code"), a number of start address signal bits ("start address pointer") and a series of word count signal bits ("word count"), all remaining data words of each block each having a group of data signal bits, wherein said step of storing comprises the substeps of:

storing the "starting address pointer" obtained from each received data block at the next available link memory (26) location following the last bock stored in a subsection of link memory (26) corresponding to the origin of the data block received as indicated by the "origination code";

generating a stop address pointer by adding the magnitude of the "start address pointer" to the "word count";

storing the step address pointer at the address ("start address") pointed to by the "start address pointer"; and storing subsequently received data words in the corresponding data block at sequential link memory locations after the "start address".

4. Memory storage apparatus for use in each channel (10) of a redundant channel control system for storing asynchronously received digital words grouped and transmitted serially in blocks from any channel to other channels, comprising:

a link receiver (24), responsive to a block having a start address word, a word count word, and a plurality of data words from the transmitting channel, for storing the words of the block, for providing a transfer request signal for each word and for providing the words in a series in response to a corresponding series of transfer demand signals;

a link interface controller (22), responsive to said transfer request signals for providing said transfer demand signals, for storing said words, for determining the identity of the transmitting channel, for providing a sequence of addressing signals for storing said start address in the next available sequential memory location after the end of the previously stored block, for providing a stop address by adding the start address to the word count, for storing said stop address at the start address, and for storing said data words starting at the next available location after the start address and each subsequent data word in sequential memory locations; and a link memory (26), responsive to said sequences of addressing signals and words, for storing said words at the addressed memory locations, the memory thus being allocated for storage of blocks according to said identity of the transmitting channel.

5. The apparatus of claim 4, wherein alteration or storage of words in the link memory (26) is achieved only by receiving words from the link receiver (66) through the link interface controller (22).

6. The apparatus of claim 4, wherein said link receiver is responsive to a block transmitted from all of the redundant channels, including the channel of said link receiver.

7. Apparatus comprising a plurality of channels, each channel comprising:

a plurality of data signal input means (42, 46, 54, 28);
a link memory (26);
a Direct Memory Access (DMA) memory (18);
a DMA controller (14) for transferring data signals received by any of said input means to said DMA memory;
link transmitter means (62);
link receiver means (24);
a plurality of cross-channel links (64, 69) for interconnecting said link transmitter means with said link receiver means and with similar link receiver means in each other one of said plurality of channels; and
a link interface controller (22) for transferring data signals from said DMA memory to said link transmitter means in data blocks for transmission to all of said link receiver means over said cross-channel data link, said link interface controller for formatting said blocks with a start address, a word count, and data words, and for storing data blocks received by said link receiver means of the related channel in said link memory by storing the start address in the next available location after the end of the last stored block, by storing at the start address a stop address and by storing the data words at sequential locations, all within a segregated portion of said link memory corresponding to the one of said channels from which said data block was transmitted over said cross channel links.

* * * * *

UNITED STATES PATENT AND TRADEMARK OFFICE
CERTIFICATE OF CORRECTION

PATENT NO. : 5,093,910

DATED : March 3, 1992

INVENTOR(S) : Bhalchandra R. Tulpule et al

It is certified that error appears in the above-identified patent and that said Letters Patent is hereby corrected as shown below:

Cover page, item no. 63, line 3, "Pat. No. 4,959,782" should read --abandoned--

Column 1, line 6, "NASA 2-11771" should read --NAS2-11771--

Column 1, lines 13, 14, "U.S. Pat. No. 4,959,782" should read --abandoned--

Column 17, claim 2, line 47, "method" should read --channel--

Column 18, claim 3, line 28, "original" should read --origin--

Column 18, claim 3, line 39, "bock" should read --block--

Column 20, claim 7, line 22, after "address" insert --(the start address plus the word count)--

UNITED STATES PATENT AND TRADEMARK OFFICE
CERTIFICATE OF CORRECTION

PATENT NO. : 5,093,910
DATED : March 3, 1992
INVENTOR(S) : Bhalchandra R. Tulpule et al It is certified that error appears in the above-indentified patent and that said Letters Patent is hereby corrected as shown below:

Column 20, claim 7, line 22, after "address" insert --(the start address pluss the word count)--.

Signed and Sealed this

Seventh Day of June, 1994

Attest:

BRUCE LEHMAN

Attesting Officer  Commissioner of Patents and Trademarks